March 18, 1941.    F. A. DEVINE    2,235,421
SUN AND GLARE SHIELD FOR AUTOMOBILES
Filed Jan. 23, 1940    2 Sheets-Sheet 1
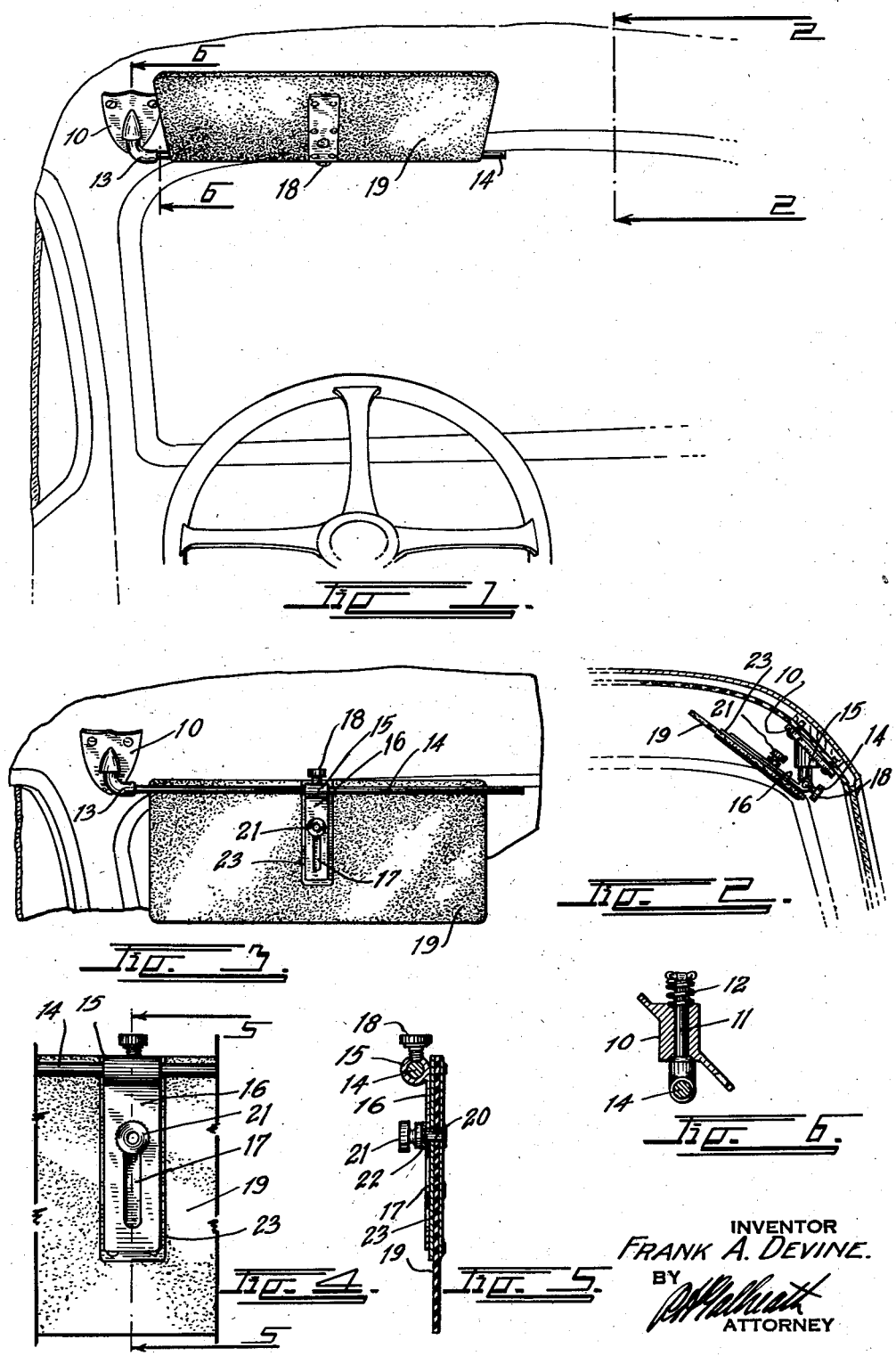
INVENTOR
FRANK A. DEVINE.
BY
ATTORNEY March 18, 1941. F. A. DEVINE 2,235,421
SUN AND GLARE SHIELD FOR AUTOMOBILES
Filed Jan. 23, 1940 2 Sheets-Sheet 2
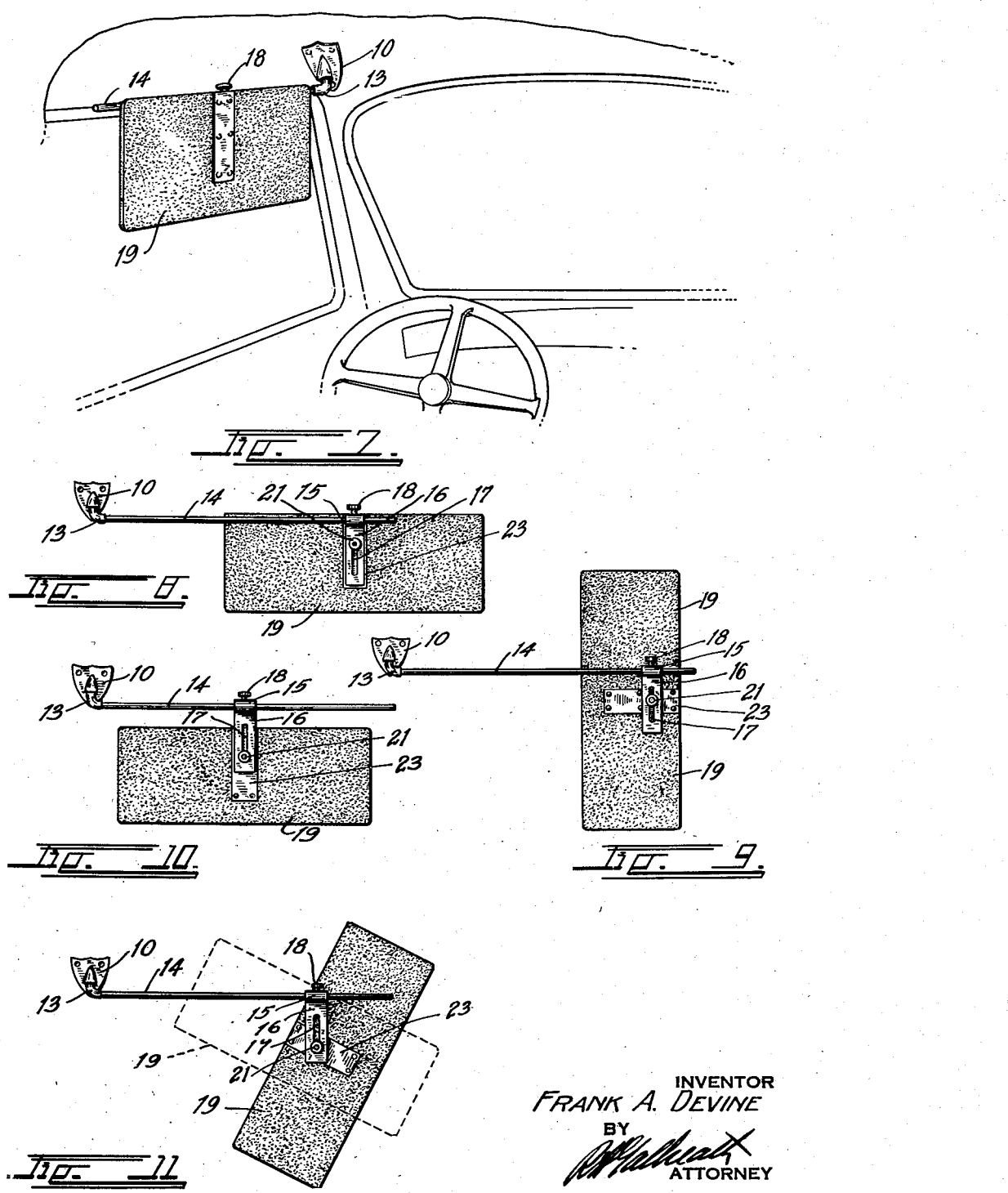
INVENTOR
FRANK A. DEVINE
BY
ATTORNEY Patented Mar. 18, 1941

2,235,421

UNITED STATES PATENT OFFICE 2,235,421

SUN AND GLARE SHIELD FOR AUTOMOBILES

Frank A. Devine, Denver, Colo.

Application January 23, 1940, Serial No. 315,139

1 Claim. (Cl. 296—97)

This invention relates to a sun glare shield for automobiles.

The usual automobile visor is designed so that it may be swung from the side door to the windshield and from a downwardly extending position to an upwardly folded position. These adjustments are not nearly sufficient to meet the requirements of driving against the sun or against bright head lights.

The principal object of this invention is to provide a support for a glare shield or visor which will allow the shield to be moved to any desired position, either to the right or to the left of the driver; which will allow the shield to be raised or lowered to any desired elevation; and yet which can be turned and folded to all the positions of the present shields.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a diagrammatic view of the interior of an automobile illustrating the improved shield in the "out of service" position.

Fig. 2 is a sectional view, taken on the line 2—2, Fig. 1, showing an end view of the shield.

Fig. 3 illustrates the shield in the normal, horizontal shielding position.

Fig. 4 is an enlarged fragmentary detail view illustrating the shield bracket.

Fig. 5 is a vertical section, taken on the line 5—5, Fig. 4.

Fig. 6 is a detail section through the mounting bracket, taken on the line 6—6, Fig. 1.

Fig. 7 is a diagrammatic, perspective view illustrating the shield in the side window position.

Figs. 8, 9, 10, and 11 illustrate various positions in which the improved shield may be placed.

The improved shield occupies the usual place of an automobile glare shield and employs a mounting bracket 10 secured to the interior of the car above and to the left of the windshield. The mounting bracket receives a vertical post 11 which is constantly drawn upwardly in the bracket by means of a spring 12. The post terminates in an elbow fitting 13 from which a relatively long, horizontal slide rod 14 projects. The spring 12 constantly holds the elbow fitting 13 in frictional engagement with the bracket so as to hold the rod 14 at any point in its arcuate swing.

A sliding sleeve 15 is mounted on the slide rod. The sleeve is formed with a relatively long, downwardly depending ear member 16 having an elongated slot 17. The sliding sleeve can be fixed to the rod at any desired position by means of a suitable set screw 18 and, when the screw is loosened, the slide member can be either rotated about the rod or moved freely therealong throughout its length.

A visor or shield 19, formed of any suitable material, such as pressed fiber or the like, is secured to the ear member 16 by means of a clamp bolt 20 which passes through the slotted opening 17 and terminates in a clamp nut 21. A spring washer 22 is preferably positioned between the nut and ear to maintain resilient, frictional engagement.

At the point where the ear 16 overlaps the shield, the latter is provided with friction plates 23 riveted or otherwise secured to the opposite sides thereof to prevent wear of the shield.

It can be readily seen that the shield can be turned upwardly, as shown in Fig. 1 or downwardly as shown in Fig. 3, or it may be swung to one side, as shown in Fig. 7, similarly to the present shield. In addition to these positions, however, the shield can be moved to a position to the right of the driver, should the sun be coming from that direction, as shown in Fig. 8, or it can be swung to a vertical position at any point along the rod 16, as shown in Fig. 9. It can be elevated or lowered while in the vertical, horizontal or any other angular position, as shown in Figs. 10 and 11. All of the above positions can be attained either at the windshield or at the side window of the car. Thus, an infinite variety of positions are provided which will meet any requirement.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A glare shield for automobiles comprising: a mounting bracket; a slide rod rotatively mounted in said mounting bracket to swing in a horizontal plane; a slide member mounted on said slide rod so that it may be moved therealong or moved thereabout; means for maintaining said slide member in any desired set position; an elongated ear projecting from said slide member and provided with a longitudinally extending slotted opening; a shield member; pivot means extending from said shield member through said slotted opening; means for clamping said pivot means in any desired position in the slotted opening; and wear plates secured to said shield member opposite said ear member.

FRANK A. DEVINE.